(12) United States Patent
Mansur et al.

(10) Patent No.: US 11,428,811 B2
(45) Date of Patent: Aug. 30, 2022

(54) FOVEAL PATTERNED OPTICAL SWITCHES FOR MEMS LIDAR BEAM STEERING UNIT

(71) Applicant: The Charles Stark Draper Laboratory, Inc., Cambridge, MA (US)

(72) Inventors: Sabrina M. Mansur, Somerville, MA (US); Theodore J. Steiner, III, Boston, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 960 days.

(21) Appl. No.: 16/190,693

(22) Filed: Nov. 14, 2018

(65) Prior Publication Data

US 2019/0146087 A1    May 16, 2019

Related U.S. Application Data

(60) Provisional application No. 62/586,113, filed on Nov. 14, 2017.

(51) Int. Cl.
  *G02B 6/42* (2006.01)
  *G01S 17/08* (2006.01)
  (Continued)

(52) U.S. Cl.
  CPC .............. *G01S 17/08* (2013.01); *G02B 6/122* (2013.01); *G02B 6/354* (2013.01); *G02B 6/3534* (2013.01);
  (Continued)

(58) Field of Classification Search
  None
  See application file for complete search history.

(56) References Cited

U.S. PATENT DOCUMENTS

| 4,013,000 A | 3/1977 | Kogelnik |
| 6,388,789 B1 * | 5/2002 | Bernstein ............ B81C 1/00214 |
| | | 359/198.1 |

(Continued)

FOREIGN PATENT DOCUMENTS

| WO | 2003098263 A2 | 11/2003 |
| WO | 2018111316 A1 | 6/2018 |

OTHER PUBLICATIONS

International Search Report and Written Opinion for PCT/US2018/060971 dated Feb. 5, 2019 entitled "Foveal Patterned Optical Switches For Mems Lidar Beam Steering Unit".

*Primary Examiner* — Chad H Smith
(74) *Attorney, Agent, or Firm* — Hamilton, Brook, Smith & Reynolds, P.C.

(57) ABSTRACT

A MEMS optical switch-based LiDAR beam steering unit may comprise an optical switching array comprising two or more translatable optical switch gratings. The two or more translatable optical switch gratings may be arranged in a foveal pattern. Each of the two or more translatable optical switch gratings may have an associated MEMS structure operative to selectively translate the optical switch grating between a first position and a second position, and a first waveguide associated with the translatable optical switch grating. The grating being in the first position may cause the grating to be sufficiently close to the first waveguide to produce a strong optical coupling between the grating and the first waveguide. The grating being in the second position may cause the grating to be sufficiently far from the first waveguide to produce a weak optical coupling between the grating and the first waveguide.

20 Claims, 3 Drawing Sheets

(51) Int. Cl.
*G02B 27/09* (2006.01)
*G02B 6/122* (2006.01)
*G02B 6/35* (2006.01)
*G02B 6/12* (2006.01)

(52) U.S. Cl.
CPC ......... *G02B 6/3548* (2013.01); *G02B 6/3584* (2013.01); *G02B 6/3598* (2013.01); *G02B 6/42* (2013.01); *G02B 27/0955* (2013.01); *G02B 2006/12107* (2013.01)

(56) References Cited

U.S. PATENT DOCUMENTS

| | | |
|---|---|---|
| 2002/0048423 A1 | 4/2002 | Frick et al. |
| 2003/0198259 A1 | 10/2003 | Zhang |
| 2010/0271614 A1 | 10/2010 | Albuquerque et al. |
| 2014/0192394 A1* | 7/2014 | Sun ...................... G02F 1/0147 359/238 |
| 2017/0108651 A1 | 4/2017 | Wagener |
| 2018/0175961 A1* | 6/2018 | Spector ................ B81B 3/0083 |

* cited by examiner

FOVEAL PATTERNED OPTICAL SWITCHES FOR MEMS LIDAR BEAM STEERING UNIT

RELATED APPLICATIONS

This application claims the benefit of U.S. Provisional Application No. 62/586,113, filed on Nov. 14, 2017. This application is related to U.S. patent application Ser. No. 15/844,527, filed on Dec. 16, 2017. The entire teachings of the above applications are incorporated herein by reference.

BACKGROUND

In a light detection and ranging (LiDAR) system, comprising a beam steering unit containing a plurality of microelectromechanical system (MEMS) optical switches, a uniform layout of switches results in the collection of data leading to a three-dimensional (3D) image of uniform resolution. The large number of optical switches, however, may result in significant costs and lower than desired collection frame rates.

SUMMARY

By arranging MEMS switches on a LiDAR beam steering unit such that information at a higher resolution will be collected in an area of interest for a specific application, and at a lower resolution in other areas, more data will be collected in the area of interest, and less data where high resolution is not critical. This in turns reduces the number of laser beams and detectors needed in the LiDAR unit, resulting in significant cost savings without sacrificing key data.

An embodiment of the present invention comprises an optical switch. The optical switch includes a waveguide and a translatable optical grating. The translatable optical grating is configured to translate between at least two positions: a first position and a second position. When the translatable optical grating is in the first position of the at least two positions, the translatable optical grating is sufficiently close to the waveguide to optically couple with the waveguide, with a coupling efficiency of at least about 25%. When the translatable optical grating is in the second position of the at least two positions, the translatable optical grating is sufficiently far from the waveguide to optically couple with the waveguide with a coupling efficiency of at most about 5%. The optical switch also includes a MEMS structure configured to selectively translate the translatable optical grating to the first position and to the second position.

Another embodiment of the present invention provides an optical switch array. The optical switch array includes a common input/output port and N other ports. A first waveguide is optically coupled to the common input/output port. A plurality of first optical switches is optically coupled to the first waveguide.

The optical switch array also includes a plurality of second waveguides. Each second waveguide of the plurality of second waveguides is optically coupled to the first waveguide via a respective first optical switch of the plurality of optical switches.

The optical switch array also includes a plurality of second optical switches. A respective subset of the plurality of second optical switches is optically coupled to each second waveguide of the plurality of second waveguides. Each second optical switch of the plurality of second optical switches is optically coupled between a respective second waveguide of the plurality of second waveguides and a respective port of the N other ports.

The optical switch array includes a translatable optical grating. The translatable optical grating is configured to translate between at least two positions. A first position of the at least two positions is sufficient close to the respective second waveguide to optically couple with the second waveguide with a coupling efficiency of at least about 25%. A second position of the at least two positions is sufficiently far from the respective second waveguide to optically couple with the second waveguide with a coupling efficiency of at most about 5%.

The optical switch array also includes a MEMS structure configured to selectively translate the translatable optical grating to the first position and to the second position.

Yet another embodiment of the present invention provides an optical send/receive terminal. The optical send/receive terminal includes a lens having a field of view and an optical switch array. The optical switch array includes a common input/output port and N other ports. The N other ports are optically coupled to the lens, such that each port of the N other ports is optically coupled to a unique portion of the lens field of view.

The optical switch array also includes a first waveguide optically coupled to the common input/output port and to a plurality of first optical switches optically coupled to the first waveguide.

The optical switch array also includes a plurality of second waveguides. Each second waveguide of the plurality of second waveguides is optically coupled to the first waveguide via a respective first optical switch of the plurality of optical switches.

The optical switch array also includes a plurality of second optical switches. A respective subset of the plurality of second optical switches is optically coupled to each second waveguide of the plurality of second waveguides. Each second optical switch of the plurality of second optical switches is optically coupled between a respective second waveguide of the plurality of second waveguides and a respective port of the N other ports.

Each second optical switch of the plurality of second optical switches includes a translatable optical grating. The translatable optical grating is configured to translate between at least two positions. A first position of the at least two positions is sufficient close to the respective second waveguide to optically couple with the second waveguide with a coupling efficiency of at least about 25%. A second position of the at least two positions is sufficiently far from the respective second waveguide to optically couple with the second waveguide with a coupling efficiency of at most about 5%.

Each second optical switch of the plurality of second optical switches also includes a MEMS structure configured to selectively translate the translatable optical grating to the first position and to the second position.

The optical send/receive terminal also includes an optical transmitter and/or an optical receiver optically coupled to the common input/output port of the optical switch array.

Optionally, a plurality of optical fibers may optically couple the N other ports to the lens.

Optionally, the optical switch array may define a surface and each second optical switch of the plurality of second optical switches may be configured to optically couple between the respective second waveguide and space beyond the surface of the optical switch array, when the second optical switch is in the first position.

Optionally, each translatable optical grating may include a respective MEMS structure.

Optionally, each first optical switch of the plurality of first optical switches may include a respective MEMS structure.

An embodiment may comprise a LiDAR beam steering unit having gratings arranged in foviated pattern.

In one aspect, the invention may be a micro-electromechanical system (MEMS) optical switch-based light detection and ranging (LiDAR) beam steering unit, comprising an optical switching array comprising two or more translatable optical switch gratings. The two or more translatable optical switch gratings may be arranged in a foveal pattern. For each of the two or more translatable optical switch gratings, the beam steering unit may comprise a MEMS structure associated with the translatable optical switch grating. The MEMS structure may be operative to selectively translate the optical switch grating between a first position and a second position. The beam steering unit may further comprise a first waveguide associated with the translatable optical switch grating.

The translatable optical grating being in the first position may cause the translatable optical grating to be sufficiently close to the first waveguide to cause a strong optical coupling between the translatable optical grating and the first waveguide. The strong optical coupling may be at least 25%.

The translatable optical grating being in the second position causes the translatable optical grating to be sufficiently far from the first waveguide to cause a weak optical coupling between the translatable optical grating and the first waveguide. The strong optical coupling may be at most 5%.

The first waveguide may be an optical waveguide configured to propagate light towards its associated optical switch grating. Each of the two or more translatable optical switch gratings may further comprise a second waveguide, the second waveguide may be configured to be optically coupled to the first waveguide. Each second waveguide may be selectively optically coupled through a second optical switch to a port. The second optical switch may comprise a secondary optical grating associated with a secondary MEMS structure. The foveated pattern may be configured based on a desired sensing resolution distribution. The desired sensing resolution may mean, for example, the directivity of the optical grating array—i.e., the desired reception sensitivity in specific directions with respect to the reference frame of the array of gratings.

In another aspect, an optical switch-based beam steering unit may comprise an optical switching array comprising two or more translatable optical switch gratings arranged in a foveal pattern. Each of the two or more translatable optical switch gratings may further comprise a micro-electromechanical system (MEMS) structure associated with the translatable optical switch grating. The MEMS structure may be operative to selectively translate the optical switch grating between a first position and a second position. Each of the two or more translatable gratings may also be associated with a first waveguide associated with the translatable optical switch grating. The first waveguides associated with the two or more translatable optical switch gratings configured to be coupled to a common input/output port.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The teachings of all patents, published applications and references cited herein are incorporated by reference in their entirety.

In accordance with embodiments of the present invention, methods and apparatus are disclosed for a steerable optical transmit and receive terminal and an associated MEMS-based optical switching network. Such a terminal does not require a phased array of emitters/collectors, nor the attendant large number of phase shifters. The optical switching network employs MEMS-based optical switches to steer the optical beam. However, the MEMS-based optical switches are significantly smaller than in the prior art, such as in H-tree based optical switches. Consequently, the optical switches may be fabricated or packed at a higher density than in the prior art, providing higher spatial resolution of the transmit/receive terminal, i.e., density of possible transmit/receive beam positions. A relatively small subset of the switches needs to be operated, therefore powered, at any given time. Therefore, the terminal overcomes the mechanical, switch density, emitter density and high-power problems associated with other systems.

Figure 3:
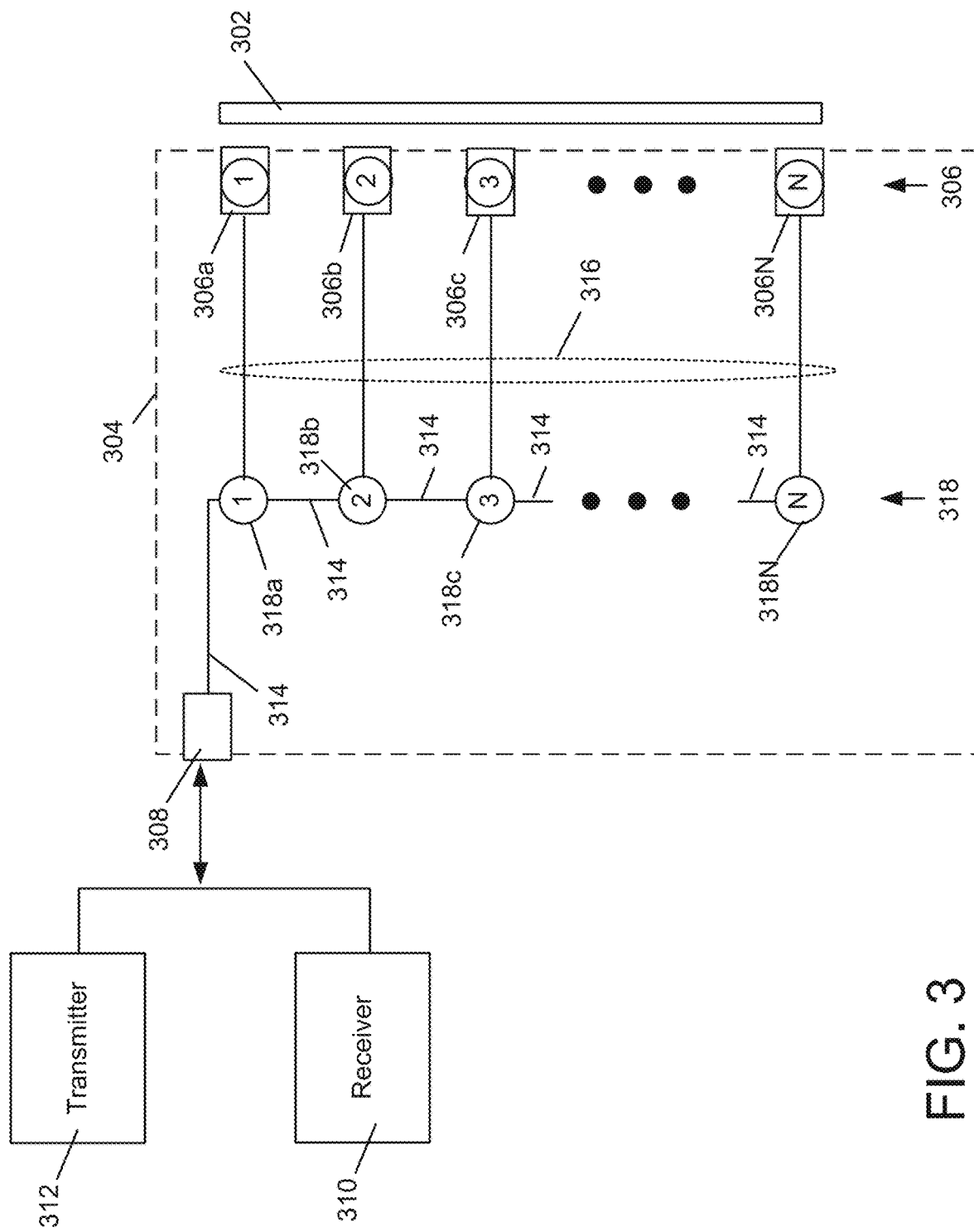
FIG. 3 shows an example optical transmit/receive terminal according to the invention.

An example optical transmit/receive terminal shown in FIG. 3, according to an embodiment of the present invention, includes a lens 302, which is optically coupled to an optical switching array 304 (also referred to as "optical switching network," "optical switch," or "optical switch array"), such that incoming light rays, represented by light rays, are focused on a surface of the optical switch. Conversely, optical signals emitted at the surface of the optical switch are optically coupled to the lens and, thereby, projected into space as light rays.

The lens 302 is preferably a wide field-of-view lens. The lens may, for example, be a gradient index (GRIN) lens, fisheye lens or monocentric lens. A suitable monocentric lens is available from Distant Focus Corporation, PO Box 7857, Champaign, Ill. 61826-7857. If the lens 302 creates a planar focused image, the lens 302 and the optical switch array may be optically coupled by air or a vacuum. However, if the lens creates a curved focused image, a bundle of optical fibers (not shown) may be used to optically couple the lens to the optical switch. One end of each optical fiber of the bundle of optical fibers may terminate on the surface of the lens, and the other end of the optical fiber may terminate on the surface of the optical switch.

A plurality of N ports 306a-306N may be distributed on the surface of the optical switch array 304. In an example embodiment, the plurality of ports 306 may be arranged in a rectangular array, although the ports may be arranged in any suitable arrangement (e.g., circular, elliptical, irregular, etc.). If optical fibers are used to couple the lens to the optical switch, one or more optical fibers may terminate at each port. The optical fibers should be arranged so the image projected by the lens is mapped to corresponding locations within the plurality of ports. Thus, each port corresponds to a unique portion of the field of view of the lens.

The optical switch array 304 may also have a single common input/output port 308. The optical switch array 304 may be configured to selectively optically couple one of the N ports 306a-306N on the surface to the common input/ output port 308. Thus, in one mode, the optical switch acts as an N×1 switch. That is, one of the N ports is coupled to the common input/output port.

The terminal may also include a suitable optical receiver 310, such as a photo diode, and/or a suitable transmitter 312, such as a laser. A LiDAR system or a two-way communication system includes both the transmitter and the receiver. However, a one-way communication system needs to include only the receiver or the transmitter, and a star tracker needs to include only the receiver. The receiver and/or transmitter are optically coupled to the common input/output port by suitable optical couplings, represented by optical coupling, such as optical fibers, mirrors and/or splitters/combiners.

Thus, an optical signal from the transmitter may be routed via the optical coupling to the optical switch and there switched to a selected one of the N ports 306a-306N. Once emitted from the surface of the optical switch, the optical signal is conveyed to the lens, such as via the optical fiber terminated at the selected port, and then by the lens into space. A direction in space, in which the optical signal is projected by the lens, depends on which port is selected. Conversely, an optical signal received by the lens, such as a return signal in a LiDAR system, is routed by the optical switch to the receiver. A direction in space, from which the optical signal is received by the lens, depends on which port is selected.

The optical switch array 304 may include the common input/output port 308. Light may enter and/or exit the common input/output port 308, as indicated by a double-headed arrow. The common input/output port is optically coupled to a first optical waveguide 314. The optical switch array 304 also includes a plurality of second optical waveguides 316. Each second optical waveguide 316 may be optically coupled to the first optical waveguide 314 via a respective first optical switch set 318, represented by first optical switches 318a, 318b, 318c, 318N.

In some embodiments, each first optical switch 318 acts as a single-pole, double-throw (SPDT) switch. Thus, assuming light enters the common input/output port 308, the first optical switch 318 selectively either allows the light to continue along the first optical waveguide 314 or diverts the light to the second optical waveguide 316. Thus, collectively, the first optical switches 318 control to which second optical waveguide 316 the light is diverted. Similarly, collectively the first optical switches 318 control from which second optical waveguide light 316 is routed to the first optical waveguide 314 and, thence, to the common input/output port 308. Although four second optical waveguides and four first optical switches are shown, any suitable number of second waveguides and first optical switches may be included.

Although an embodiment in which each first optical switch is a binary optical switch is described, in some embodiments described herein, each first optical switch controls a non-binary, i.e., not ON-OFF, extent to which the respective second optical waveguide is optically coupled to the first optical waveguide. In these embodiments, light entering the common input/output port may be selectively (equally or non-equally) divided among two or more of the second optical waveguides.

A respective plurality of second optical switches (represented by circles within the ports 306a, 306b, 306c, 306N) is optically coupled to each second optical waveguide. For example, second optical switches are optically coupled to the second optical waveguide. Each second optical switch may selectively optically couple the respective second optical waveguide to free space. The second optical switches may be coupled between the second optical waveguides and the N ports 306, or each second optical switch may form part or all of one of the N ports 306.

In some embodiments, each second optical switch acts as a single-pole, double-throw (SPDT) switch. Thus, assuming light enters the common input/output port, the second optical switch selectively either allows the light to continue along the second optical waveguide or diverts the light out of the second optical waveguide, as indicated by a two-headed arrow. The two-headed arrow extends out of the plane of the drawing. Thus, collectively, the second optical switches control to which port of the N ports the light is diverted. Similarly, collectively the second optical switches control from which port of the N ports light is routed to the first optical waveguide and, thence, to the common input/output port.

Although a specific number (e.g., 4) of second optical switches may be deployed in an example embodiment, any number of second optical switches may be employed. All the second optical waveguides need not have equal numbers of second optical switches.

Each first and second optical switch may be a binary optical switch, i.e., an ON-OFF switch. Thus, the first and second optical switches determine an optical route for an optical signal traveling through the switch array, between the common input/output port and a selected port of the N ports.

Each first optical switch may be implemented by any suitable optical switch. In some embodiments, each first optical switch is be implemented by a pair of MEMS-actuated adiabatic optical couplers. Each first optical switch may be implemented using two optical waveguides, although the two waveguides need not cross. A switching element that includes a pair of MEMS-actuated adiabatic couplers may be disposed optically between the two optical waveguides.

In an OFF state, the adiabatic couplers are located far enough above (e.g., about 1 μm) the optical waveguides so that light continues to propagate along one of the waveguides without appreciably coupling to the other waveguide.

In an ON state, the adiabatic couplers are physically moved toward the waveguides by MEMS electrostatic gap-closing actuators, and light is therefore efficiently coupled from one of the waveguides into the adiabatic coupler and between the adiabatic coupler and the other waveguide of the two waveguides.

Alternatively, each first optical switch may be implemented using a standard Mach-Zehnder interferometer type switch, for example with thermal phase shifters.

As noted, the surface of the optical switch has N ports, and the lens focuses incoming light rays onto the N ports, and/or the lens projects optical signals emitted via the N ports into space. Optical gratings are efficient devices for emitting light out of the plane of the second optical waveguides or coupling out-of-plane light into the second optical waveguides, as indicated by the two-headed arrow. An optical grating is a spatially period structure that defines a plurality of regions having a first refractive index, interspersed with regions having a different second refractive index. The spatial period is selected based on the wavelength of interest. In some cases, periodic grooves are defined in a material. In other cases, two different materials are alternated. For simplicity of explanation, the term "groove" is used herein to represent an actual groove, i.e., void, or one of the two alternating materials of an optical grating.

Such optical gratings may be disposed at or near the surface. Each second optical switch may be implemented by such an optical grating. In particular, each second optical switch may be implemented by a translatable optical grating, i.e., an optical grating that is configured to translate between at least two positions. In a first ("ON") position, the optical grating is sufficient close to one of the second optical waveguides to optically couple with the second optical waveguide with a coupling efficiency, at a wavelength of interest, of at least about 25%. In a second ("OFF") position, the optical grating is sufficient far from the second optical waveguide to optically couple with the second optical waveguide with a coupling efficiency, at the wavelength of interest, of at most about 5%, preferably less than 1%.

Each second optical switch may include a MEMS structure that is configured to selectively translate the translatable optical grating to the ON position and to the OFF position. One of the second optical switches may include a translatable grating, which defines a plurality of parallel or approximately parallel periodic grooves. The grooves may be separated by walls, represented by walls. The grooves and walls may be implemented by respective materials having different refractive indexes. The walls may be made of silicon, silicon nitride or another suitable material using conventional semiconductor fabrication techniques. The grooves may be voids or suitable material different from the walls. Although the translatable grating is shown with six walls, any suitable number of walls and/or grooves may be used. The translatable grating is disposed above a second optical waveguide, one of the second optical waveguides.

In the OFF position, the translatable optical grating of the second optical switch is disposed a distance from the second optical waveguide sufficient to optically couple with the second optical waveguide with a coupling efficiency of at most about 5%, preferably less than 1%, and in some embodiments less than 0.1%. In some embodiments, the distance may be about 1 µm (1,000 nm). In some embodiments, the distance may be about 800 nm. In some embodiments, the distance may be about 250 nm. In the OFF position, most or substantially all light in the second optical waveguide continues along the second optical waveguide, as indicated by an arrow. Similarly, very little or substantially no light from free space couples via the optical grating into the second optical waveguide.

The second optical waveguide may be fabricated using conventional semiconductor fabrication techniques on a suitable semiconductor wafer, such as a silicon or silicon nitride wafer. The second optical waveguide may be fabricated on a suitable oxide or other passivation layer.

In the ON position, the translatable optical grating may be disposed a distance from the second optical waveguide sufficient to optically couple with the second optical waveguide with a coupling efficiency of at most least 25%. In some embodiments, the distance is about 10-50 nm. In the ON position, much, most or substantially all light in the second optical waveguide is emitted by the translatable optical grating into free space. Similarly, much, most or substantially all light of a suitable mode from free space couples via the optical grating into the second optical waveguide.

The translatable grating may be disposed a distance (D) about 20 nm from the second optical waveguide. The second optical waveguide may be about 150 nm thick (T) silicon on an oxide substrate. The input light beam may be Gaussian with an about 2.5 µm radius. The translatable grating is about 50 nm thick (H). The translatable grating has a groove period (A) of about 580 nm. Appropriate modifications may be made, such as changing the groove period (A) for other wavelengths of light, as would be known by one of ordinary skill in the art.

Each second optical switch may include a MEMS structure that is configured to selectively translate the translatable optical grating to the ON position and to the OFF position.

The translatable optical grating is part of a bridge. The bridge is spaced apart from, and disposed above, the substrate. The substrate may include a buried oxide layer. The bridge may be supported by respective piers. The second optical waveguide may be disposed in or on the substrate under the translatable optical grating.

The bridge may include two first electrostatic actuation electrodes. Two corresponding second electrostatic actuation electrodes may be disposed on the substrate, such that the two first actuation electrodes register over the two second actuation electrodes, respectively. The bridge also includes two flexures.

Thus, if an electric potential is applied across the first and second actuation electrodes, a resulting electrostatic force urges the first actuation electrodes and the translatable optical grating toward the substrate, thereby bringing the translatable optical grating within an appropriate distance of the second optical waveguide to turn the optical switch ON. Absent such an electric potential and the resulting electrostatic force, the flexures return the translatable optical grating to the OFF position. A boss may be included to limit travel distance of the translatable optical grating in the ON position.

A relatively small number, such as one each, of the first and second optical switches needs to be operated to route an optical signal from the common input/output port to the selected port. This small number of switches therefore consumes much less energy than phase shifters in a comparable optical phased array. In addition, the MEMS-based first and second optical switches are smaller, and can therefore be fabricated or packed more densely, than phase shifters or binary optical switch of an H-tree.

In the described system and method, the first and second optical switches fully direct the light down one path or another. It also possible to partition the optical switch into multiple optical switch arrays, each operating independently and each handling a non-overlapping subset of the N ports. This is similar to including multiple optical switches in the optical transmit/receive terminal. Multiple optical switch arrays or a partitioned optical switch array can handle multiple diverse light rays, i.e., each light ray being directed in a different direction is space.

The optical gratings (i.e., optical switches) described herein may be arranged in a pattern, for example in a regular array comprising M rows by N columns, for use in a MEMS optical switched LiDAR system. In some embodiments, the grating arrangement may comprise a particular pattern to dispose gratings in positions where enhanced (i.e., higher resolution than other areas) resolution image data is required.

Figure 1:
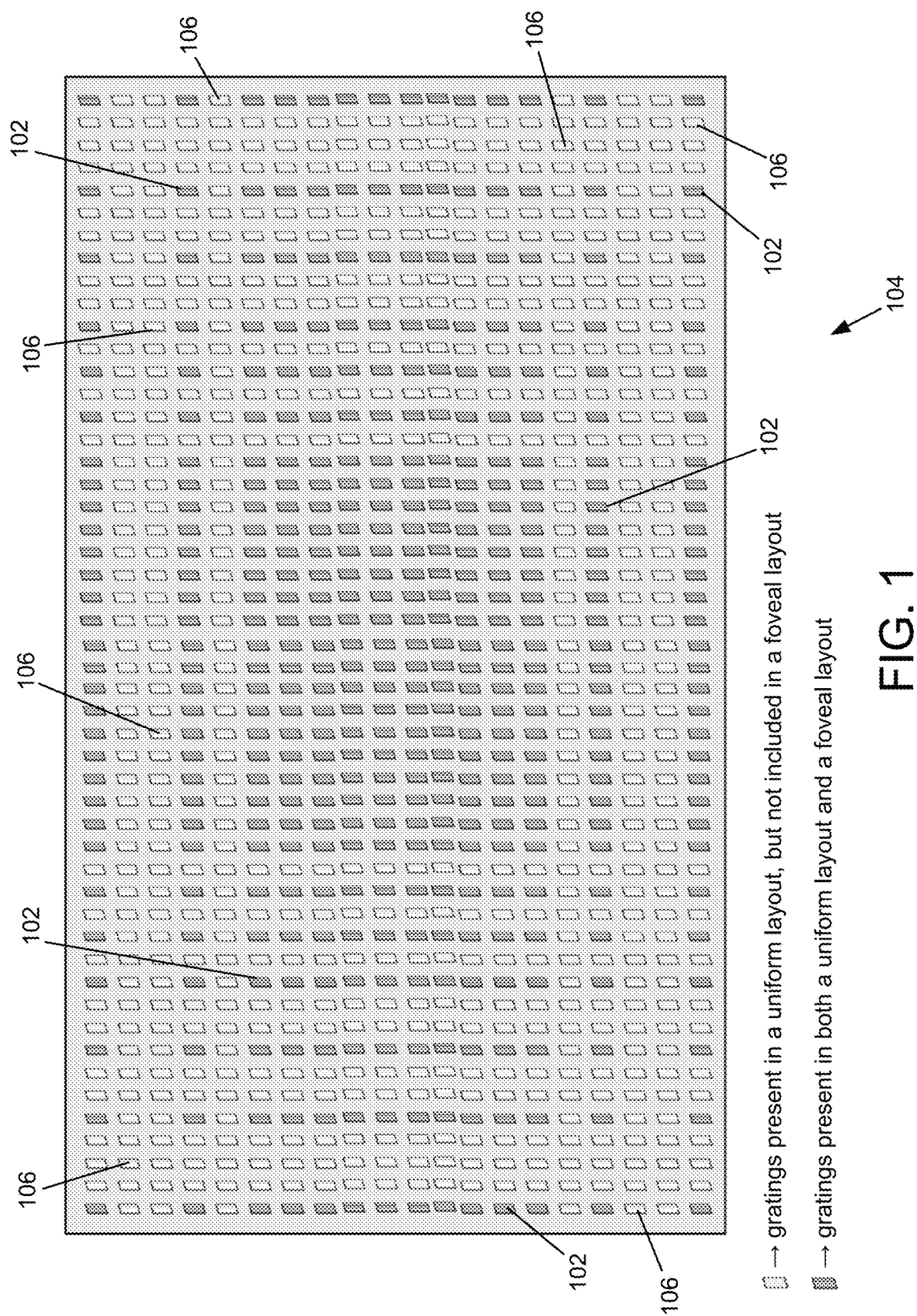
FIGS. 1 and 2 show optical gratings arranged in a foveated pattern, according to the invention.
Figure 2:
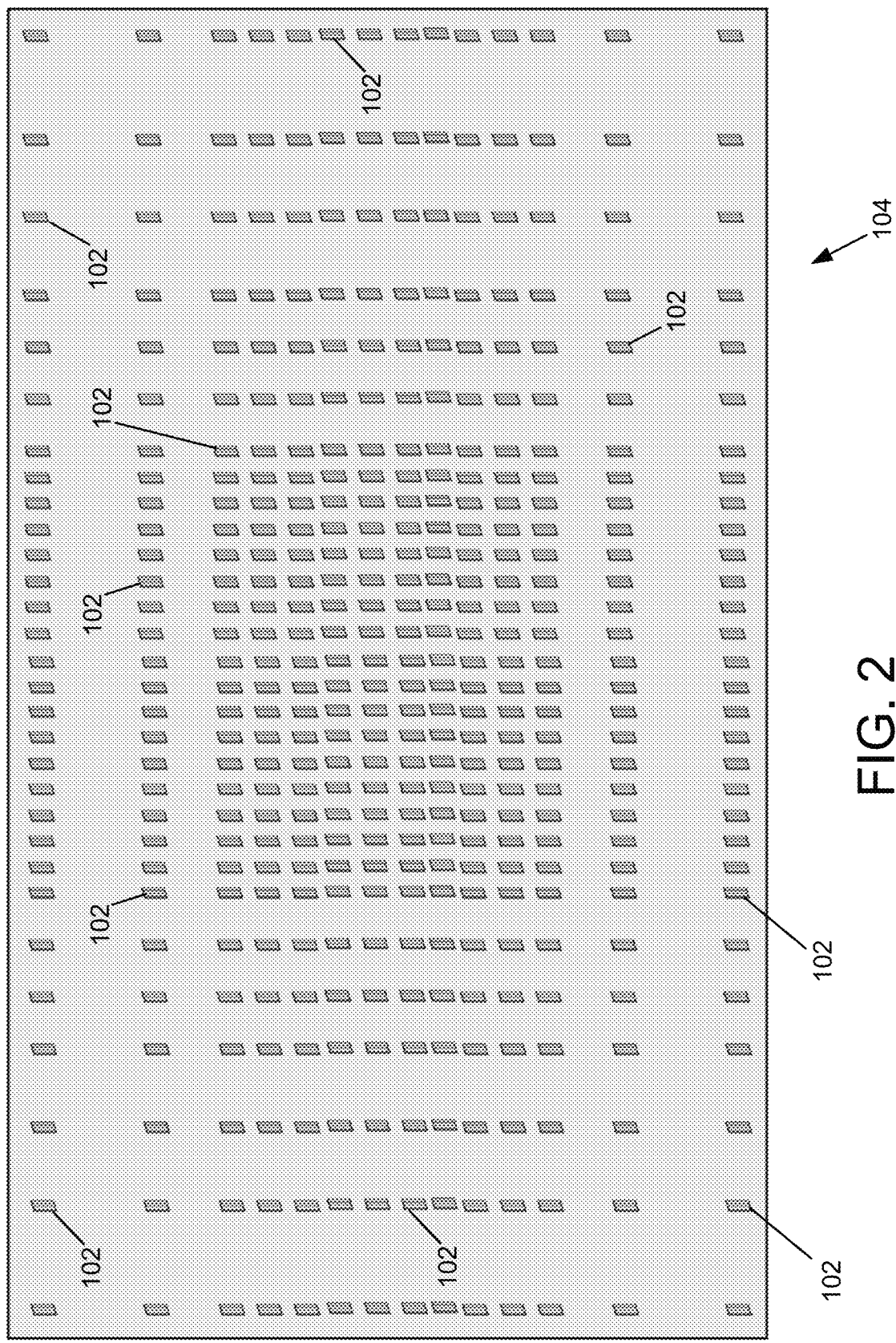

In the example embodiment of FIGS. 1 and 2, gratings 102, which may correspond to the optical switches 306 shown in FIG. 3, are disposed in a foveated pattern 104. As described herein, a foveated pattern is characterized by gratings concentrated near the center of the arrangement, with gratings distributed about the center region according to desired regions of resolution. For clarity and legibility, only certain ones of the gratings, but not all, are designated with reference number 102 in FIG. 1. FIG. 1 shows the gratings 102 in a foveated pattern (shown as dark lined blocks) disposed within a regular array of M rows by N columns, where the non-grating positions shown as light-colored blocks 106 (again for clarity, only certain ones of the non-grating positions are designated with reference number 106). FIG. 2 shows only the gratings 102, without the non-grating positions 106. In FIGS. 1 and 2, the center-most region of the arrangement provides higher resolution than the peripheral regions of the arrangement.

Using a foveated pattern of optical gratings as depicted in FIGS. 1 and 2, overall resolution requirements may be met while using substantially fewer gratings than in a regular N by M arrangement. The use of fewer gratings in the foveated arrangement of the described embodiments may result in lower cost as compared to the N by N arrangement. Further, fewer gratings (i.e., optical switches) may facilitate a higher frame rate for each scene.

The embodiments of FIGS. 1 and 2 are intended to be examples, and are not intended to be limiting. Other foveated patterns suitable for providing high resolution information may also be used. The foveated pattern of optical switch gratings may be disposed in a planar arrangement (i.e., along a plane), along a spherical curvature or other suitable spatial arrangement.

As used herein, a "dielectric" material is a material having an electrical conductivity no greater than about $10^{-6}$ Ω-m. As used herein, electrically "conductive" or an electrical "conductor" means having an electrical resistance less than about 100 kΩ.

Although aspects of embodiments may be described with reference to flowcharts and/or block diagrams, functions, operations, decisions, etc. of all or a portion of each block, or a combination of blocks, may be combined, separated into separate operations or performed in other orders. References to a "module" are for convenience and not intended to limit its implementation. All or a portion of each block, module or combination thereof may be implemented as computer program instructions (such as software), hardware (such as combinatorial logic, Application Specific Integrated Circuits (ASICs), Field-Programmable Gate Arrays (FPGAs), processor or other hardware), firmware or combinations thereof.

Embodiments, or portions thereof, may be implemented by one or more processors executing, or controlled by, instructions stored in a memory. Each processor may be a general purpose processor, such as a central processing unit (CPU), a graphic processing unit (GPU), digital signal processor (DSP), a special purpose processor, etc., as appropriate, or combination thereof.

The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-writable storage media (e.g., read-only memory devices within a computer, such as ROM, or devices readable by a computer I/O attachment, such as CD-ROM or DVD disks), information alterably stored on tangible writable storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

While example embodiments have been particularly shown and described, it will be understood by those skilled in the art that various changes in form and details may be made therein without departing from the scope of the embodiments encompassed by the appended claims.

What is claimed is:

1. A micro-electromechanical system (MEMS) optical switch-based light detection and ranging (LiDAR) beam steering unit, comprising:
    an optical switching array comprising two or more translatable optical switch gratings, the two or more translatable optical switch gratings arranged in a foveal pattern;
    for each of the two or more translatable optical switch gratings:
        a MEMS structure associated with the translatable optical switch grating, the MEMS structure operative to selectively translate the optical switch grating between a first position and a second position; and
        a first waveguide associated with the translatable optical switch grating.

2. The MEMS optical switch-based LiDAR beam steering unit of claim 1, wherein the translatable optical grating being in the first position causes the translatable optical grating to be sufficiently close to the first waveguide to cause a strong optical coupling between the translatable optical grating and the first waveguide.

3. The MEMS optical switch-based LiDAR beam steering unit of claim 2, wherein the strong optical coupling is at least 25%.

4. The MEMS optical switch-based LiDAR beam steering unit of claim 1, wherein the translatable optical grating being in the second position causes the translatable optical grating to be sufficiently far from the first waveguide to cause a weak optical coupling between the translatable optical grating and the first waveguide.

5. The MEMS optical switch-based LiDAR beam steering unit of claim 2, wherein the strong optical coupling is at most 5%.

6. The MEMS optical switch-based LiDAR beam steering unit of claim 1, wherein the first waveguide is an optical waveguide configured to propagate light towards its associated optical switch grating.

7. The MEMS optical switch-based LiDAR beam steering unit of claim 1, wherein each of the two or more translatable optical switch gratings further comprises a second waveguide, the second waveguide configured to be optically coupled to the first waveguide.

8. The MEMS optical switch-based LiDAR beam steering unit of claim 7, wherein each second waveguide is selectively optically coupled through a second optical switch to a port.

9. The MEMS optical switch-based LiDAR beam steering unit of claim 8, wherein the second optical switch comprises a secondary optical grating associated with a secondary MEMS structure.

10. The MEMS optical switch-based LiDAR beam steering unit of claim 1, wherein the foveated pattern is configured based on a desired sensing resolution distribution.

11. An optical switch-based beam steering unit, comprising:
    an optical switching array comprising two or more translatable optical switch gratings arranged in a foveal pattern;
    each of the two or more translatable optical switch gratings further comprising:
        a micro-electromechanical system (MEMS) structure associated with the translatable optical switch grating, the MEMS structure operative to selectively translate the optical switch grating between a first position and a second position; and a first waveguide associated with the translatable optical switch grating;

the first waveguides associated with the two or more translatable optical switch gratings configured to be coupled to a common input/output port.

12. The optical switch-based beam steering unit of claim 11, wherein the translatable optical grating being in the first position causes the translatable optical grating to be sufficiently close to the first waveguide to cause a strong optical coupling between the translatable optical grating and the first waveguide.

13. The optical switch-based beam steering unit of claim 12, wherein the strong optical coupling is at least 25%.

14. The optical switch-based beam steering unit of claim 11, wherein the translatable optical grating being in the second position causes the translatable optical grating to be sufficiently far from the first waveguide to cause a weak optical coupling between the translatable optical grating and the first waveguide.

15. The optical switch-based beam steering unit of claim 14, wherein the strong optical coupling is at most 5%.

16. The optical switch-based beam steering unit of claim 11, wherein the first waveguide is an optical waveguide configured to propagate light towards its associated optical switch grating.

17. The optical switch-based beam steering unit of claim 11, wherein each of the two or more translatable optical switch gratings further comprises a second waveguide, the second waveguide configured to be optically coupled to the first waveguide.

18. The optical switch-based beam steering unit of claim 17, wherein each second waveguide is selectively optically coupled through a second optical switch to a port.

19. The optical switch-based beam steering unit of claim 18, wherein the second optical switch comprises a secondary optical grating associated with a secondary MEMS structure.

20. The optical switch-based beam steering unit of claim 11, wherein the foveated pattern is configured based on a desired sensing resolution distribution.

* * * * *